Oct. 7, 1969　　　　J. C. LEWIS, JR　　　3,471,202
BRUSH MACHINERY AND BRUSH CONSTRUCTIONS
Filed Sept. 12, 1966　　　　　　　　5 Sheets-Sheet 1
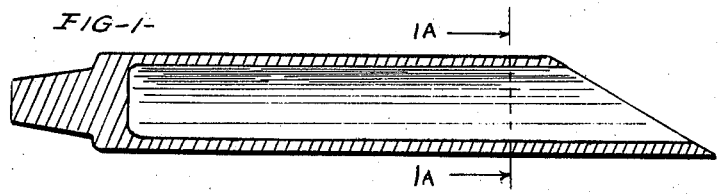
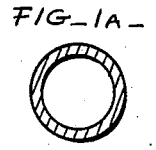
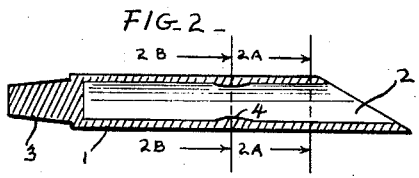
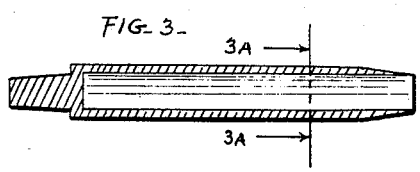
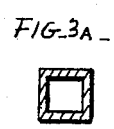
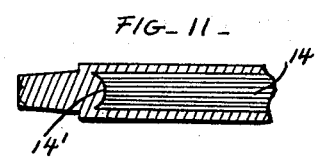
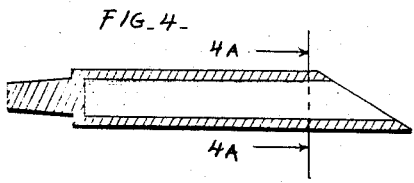
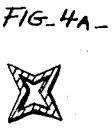
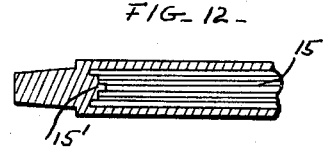
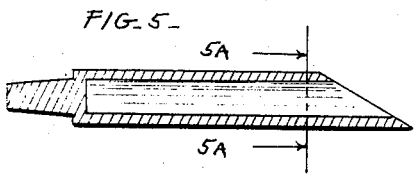
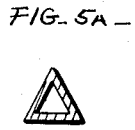
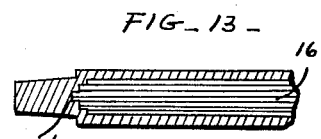
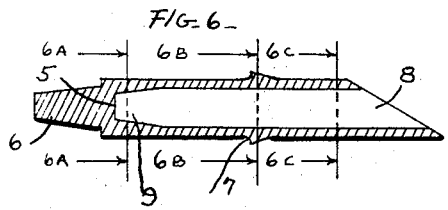
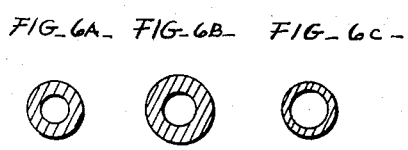
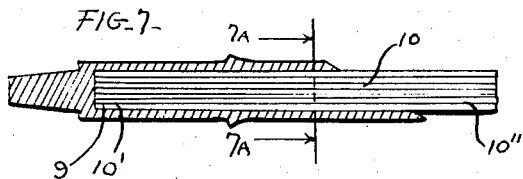
INVENTOR
John C. Lewis, Jr.

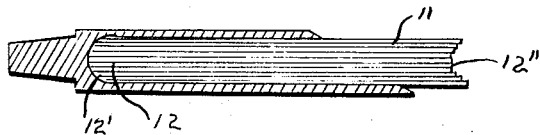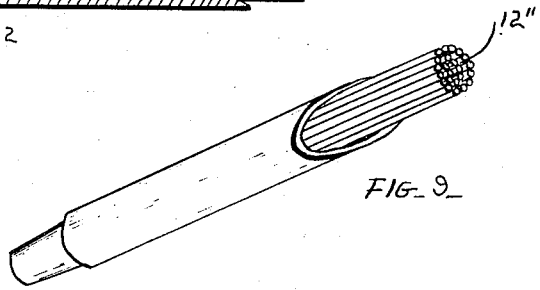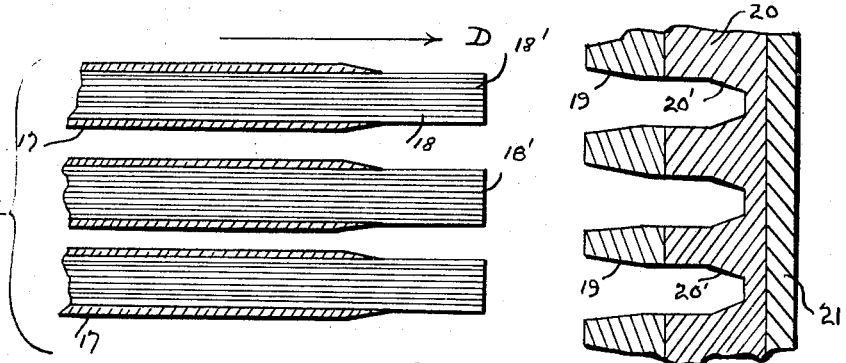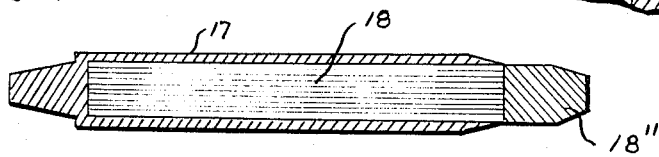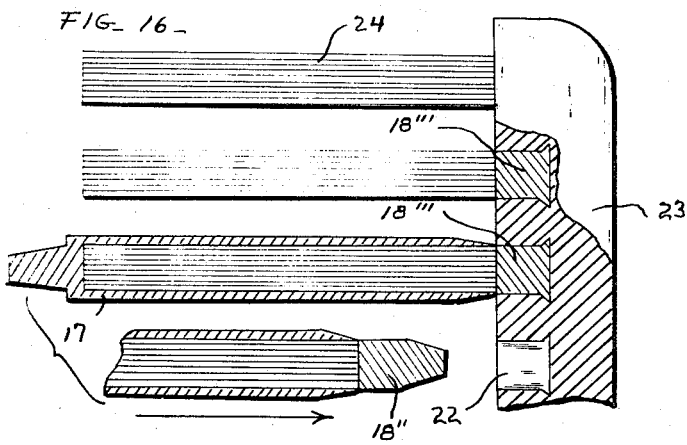

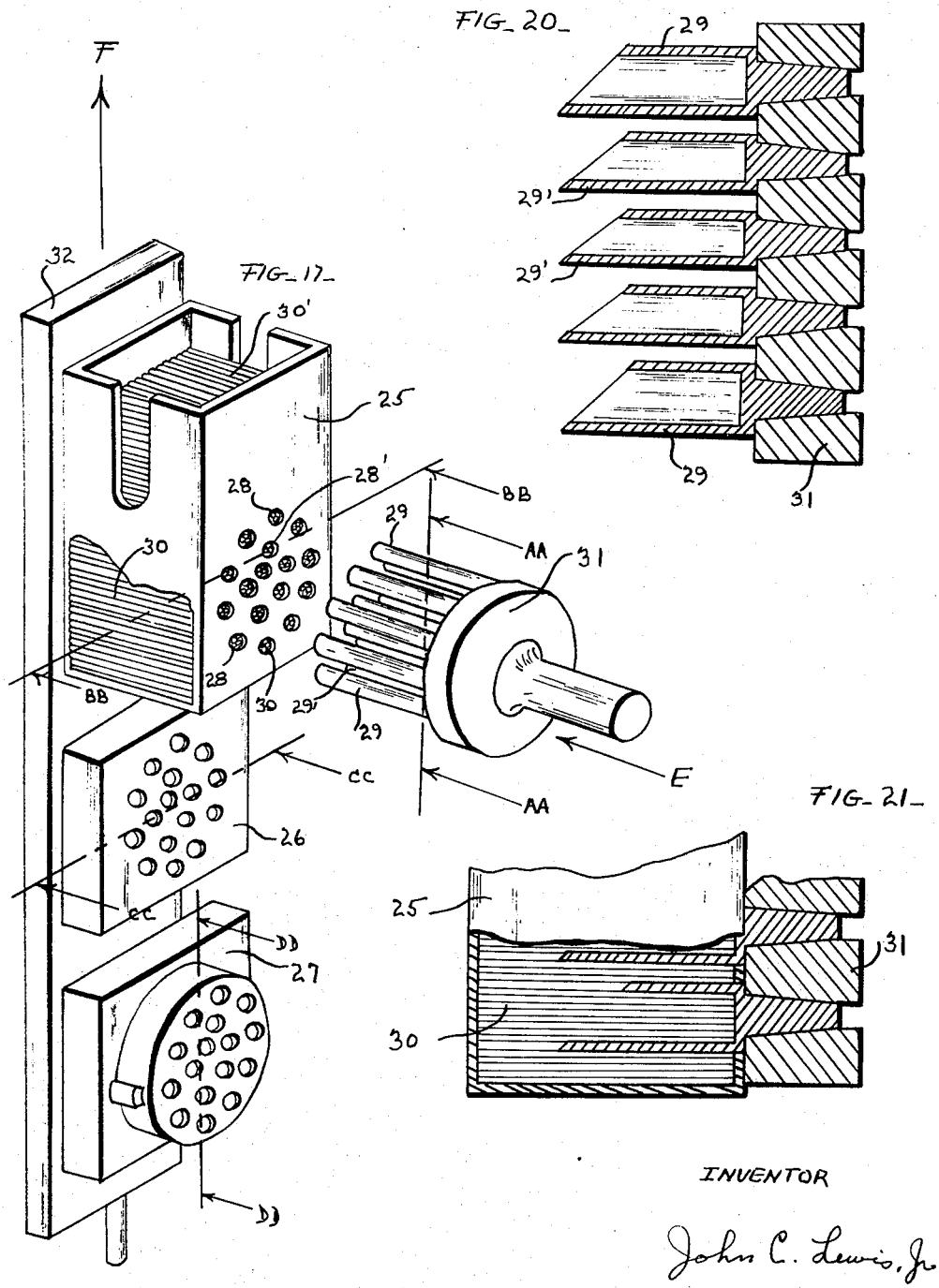

Oct. 7, 1969 J. C. LEWIS, JR 3,471,202
BRUSH MACHINERY AND BRUSH CONSTRUCTIONS
Filed Sept. 12, 1966 5 Sheets-Sheet 4

INVENTOR.
John C. Lewis, Jr.

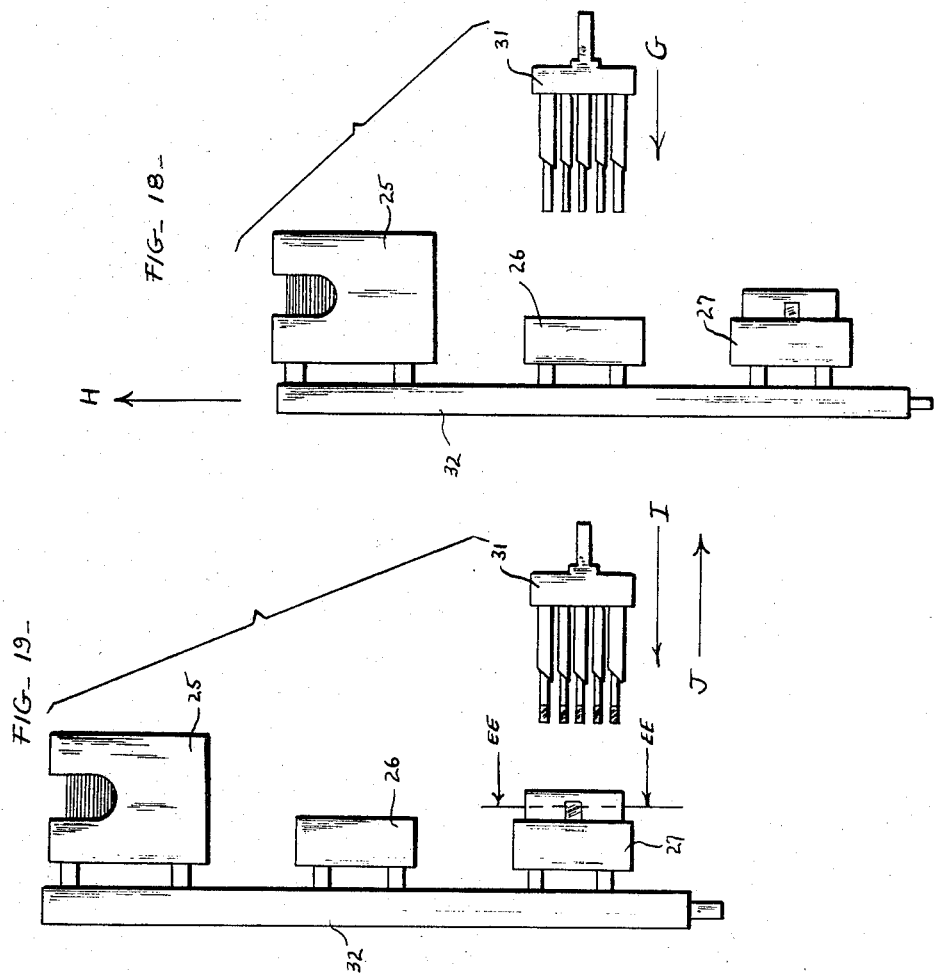

United States Patent Office 3,471,202
Patented Oct. 7, 1969

3,471,202
BRUSH MACHINERY AND BRUSH CONSTRUCTIONS
John C. Lewis, Jr., 29 South St., Middlebury, Vt. 05753
Filed Sept. 12, 1966, Ser. No. 578,840
Int. Cl. A46d 1/08
U.S. Cl. 300—2                        1 Claim

ABSTRACT OF THE DISCLOSURE

This invention, consisting of a new and useful brush-making apparatus, allows tufted brush components to be manufactured having pretrimmed synthetic filament tufts. Said apparatus is capable of picking and trimming all the desired tufts required in a single brush construction simultaneously, and further, simultaneously inserting all the tufts into the construction. The apparatus comprises a suitable filament stock box for dispensing cut-to-length synthetic filament and a picking unit containing tuft-forming devices which when inserted into said stock box will pick and trim the desired tuft configuration of any brush component.

---

This invention relates to new and useful brush-making machinery. More specifically, it is concerned with machinery for continuously fabricating modular brush components. It also includes novel brush constructions and methods of manufacture.

The brush industry and the brush-making art during the last fifty years has remained, for the most part, unchanged. The only major changes taking place have been in the substitution of synthetic monofilaments (thermoplastic fibres, i.e., nylon monofilament) for the vegatable and hair fibres previously employed. The emphasis has been on finding ways to substitute directly the synthetic for the natural, utilizing the same brush-making equipment, i.e. stapling machinery, and little or no effect placed upon improving the methods and machinery used. Great strides have been made wherein two or three brushes can be stapled simultaneously, however, it still requires one picking and stapling cycle for each fibre tuft staple-set in the brush back. In this area, there has been no advancement toward finding a way of placing all the desired tufts in a brush back simultaneously; and performing this feat in the same amount of time required to pick and staple-set one fibre tuft employing conventional brush machinery.

The need to improve the machinery for fabricating brush components can be illustrated by comparing and describing conventional brush-making machinery with the machinery of this invention. The brush-making machinery of this invention differs from ordinary brush machinery in that it employs a new method of picking fibre tufts. The conventional stapling machine employs a picker which removes a fibre tuft from a stock or feed box by first entering the stock box approximately at its midsection (lateral to the parallel fibre) and picking a given amount of fibre at the fibre's midsection. The picker then proceeds to transport the predetermined volume of parallel fibre to a means for doubling the fibre at its midsection (prior to stapling), thus resulting in a tuft having a U-shape wherein both ends of each individual fibre are located at the working tip of the resultant tuft. A staple or anochor (wire member) is then inserted through the U-shaped loop and the tuft then forced into a predrilled hole in a brush back. Each tuft is formed in this manner one after another until the necessary number of holes have been filled.

The picking device of the machinery of this invention works on an entirely different principle. The picker or picking unit enters the fibre stock box from the end (longitudinal to the fibre) and engages the fibre from the end, thus instantly forming a fibre tuft. The fibre employed in forming tufts in this manner is one-half the original length of the fibre required using the conventional picking method. The instantly formed fibre tuft is then automatically inserted into a brush back. The resultant fibre tuft can be anchored in many ways; i.e., heat sealed, set in epoxy, and the like. However, the preferred method is to heat seal the fibre tuft. This can be done either prior to inserting the tuft into the brush back or after inserting the tuft through a portion of the brush back. Fibre tufts formed in this manner are anchored securely within the brush back and can not be removed.

Since, when forming tufts using this new and novel method of picking, there is no requirement for doubling the fibre prior to insertion into the brush back, tufts so formed in accordance with this invention require no trimming. This results in an appreciable savings to the brushmaker. A second economic savings is also realized, that being the elimination of the staple or anchor.

It is of particular importance in this invention that the picking device employed operates in such a manner that at least two fibre tufts are simultaneously formed. However, the perferred cycle for picking is one in which a complete brush component is formed simultaneously by employing a series of picking devices (hereinafter refered to as a picking unit) set in a prearranged pattern and heat sealing all the fibre tufts instantly, thus forming a brush in the same cycling time it takes to pick and staple-set one fibre tuft using the conventional machinery.

Objects and advantages of the invention will be set forth in part hereinafter and in part will be obvious herefrom, or may be learned by practice with the invention, the same being realized and attained by means of the methods, combinations, compositions and improvements pointed out in the appended claim.

The invention consists in the novel steps, methods, combinations, compositions and improvements herein shown and described.

The objects of this invention will now be described. While the invention is primarily concerned with new and novel brush machinery, it should be realized that the principles of this invention are attained only through the novel method of picking and forming fibre tufts, and these principles are aplicable to situations wherein: (1) single fibre tufts are formed, (2) multiple fibre tufts are formed, (3) complete brush components are simultaneously formed, and (4) continuous modular brush components are formed.

It is, therefore, an object of this invention to provide new and useful brush-making machinery. Another object of this invention is to provide an automatic brush machine which can form more than one fibre tuft simultaneously. A further object of this invention is to provide an automatic brush machine which will simultaneously pick fibre tufts, assemble the tufts in a predetermined pattern and form an integral fibre tuft/brush support modular brush component. A still further object of this invention is to provide a brush machine of the type set forth in the foregoing object wherein the picking unit comprises an assembly of individual tuft pickers arranged in a predetermined tuft pattern allowing the complete fibre portion of the brush component to be formed simultaneously. Another object of this invention is to provide a brush machine comprising means for heat sealing fibre tufts integral with a brush support. A still further object of this invention is to provide a brush machine which assembles cut-to-length thermoplastic fibre into fibre tufts wherein no trimming of the tufts is required. Yet still a further object of this invention is to provide a brush machine as set forth in the foregoing object wherein the original length of the fibre employed is nearly the same as the finished fibre tuft, and not double the length as is true with the staple-set U-loop tuft.

Another object of this invention is to provide a novel and new picking device.

Another object of this invention is to provide a brush machine comprising at least two different size tuft picking devices, the picking devices so arranged in the picking unit, that at least two different size fibre tufts can be simultaneously formed. Yet a further object of this invention is to provide a brush machine of the type set forth in the foregoing object wherein at least two different length tufts are simultaneously formed. A still further object of this invention is to provide a brush machine comprising at least two different feed stock boxes, thus allowing for forming brush components having more than one type of fibre tuft, and/or more than one color fibre tuft.

Another object of this invention is to provide a tufted brush construction comprising heat sealed synthetic fibre tufts. A further object of this invention is to provide a tufted brush construction comprising at least two different size heat sealed tufts, said tufts being formed from thermoplastic fibre having an original length only slightly longer than the length of the finished fibre tuft. Yet still a further object of this invention is to provide a tufted brush construction comprising heat sealed fibre tufts possessing different trims wherein the tufts are set in such a pattern as to be opposing one another.

Further objects of this invention are to provide novel methods for the production of tufted brush constructions, and brush constructions employing some of the feature of the types set forth in the foregoing objects.

In the drawing:

FIGURE 1 is a longitudinal sectional view of a tuft forming picker of this invention. FIGURE 1A is a cross-sectional view taken along line 1A–1A of FIGURE 1.

FIGURE 2 is a longitudinal sectional view of another tuft forming picker of this invention having an internal venturi section. FIGURES 2A and 2B are cross-sectional views taken along lines 2A—2A and 2B—2B, respectively, of FIGURE 2.

FIGURE 3 is a longitudinal sectional view of a tuft forming picker of this invention having a square cross-sectional construction. FIGURE 3A is a cross-sectional view taken along line 3A—3A of FIGURE 3.

FIGURE 4 is a longitudinal sectional view of a tuft forming picker of this invention having a star-like cross-sectional construction. FIGURE 4A is a cross-sectional view taken along line 4A—4A of FIGURE 4.

FIGURE 5 is a longitudinal sectional view of a tuft forming picker of this invention having a triangular cross-sectional construction. FIGURE 5A is a cross-sectional view taken along line 5A—5A of FIGURE 5.

FIGURE 6 is a longitudinal sectional view of a tuft forming picker having an internal tapered section in accordance with this invention. FIGURES 6A, 6B and 6C are cross-sectional views taken along lines 6A—6A, 6B—6B and 6C—6C, respectively, of FIGURE 6.

FIGURE 7 is a longitudinal sectional view of the tuft forming picker of FIGURE 6 containing parallel synthetic fibre in accordance with this invention. FIGURE 7A is a cross-sectional view taken along line 7A—7A of FIGURE 7.

FIGURE 8 is a longitudinal sectional view of a tuft forming picker in accordance with this invention which is employed to form a shaped end on a fibre tuft.

FIGURE 9 is a perspective view illustrating how the tuft forming picker of FIGURE 8 may be employed to form a predetermined quantity of individual parallel synthetic fibres into a tuft.

FIGURE 10 is a perspective view of a tuft as formed in accordance with this invention with one end heat sealed which forms the tuft base and the other end possessing a rounded trim.

FIGURES 11, 12 and 13 are longitudinal sectional views of tuft forming pickers illustrating other shapes which may be imparted to tufts in accordance with this invention.

FIGURE 14 is a longitudinal sectional view of a group of tuft forming pickers in accordance with this invention illustrating fibre ends prior to tuft-end formation.

FIGURE 15 is a longitudinal sectional view of one of the tuft forming pickers of FIGURE 14 containing a heat sealed fibre tuft as formed in accordance with this invention.

FIGURE 16 is a sectional view in cross-section of a brush back with tufts as formed in accordance with this invention.

FIGURE 17 is a detailed fragmentary view in perspective and partly in section showing one arrangement of the tuft forming pickers, a synthetic fibre storage hopper, a heat sealing die and a brush back/fibre tuft assembly station in accordance with this invention wherein the tuft forming pickers are opposite the fibre storage hopper. FIGURES 18 and 19 are further extensions of FIGURE 17 wherein the tuft forming pickers are opposite the heat sealing die and the brush back/fibre tuft assembly station respectively.

FIGURE 20 is a side cross-sectional view taken along line AA—AA in FIGURE 17 of one arrangement of the tuft forming pickers employed to form a brush in accordance with this invention.

FIGURE 21 is a side cross-sectional view taken along line BB—BB of FIGURE 17 of the synthetic fibre storage hopper.

Figure 22:
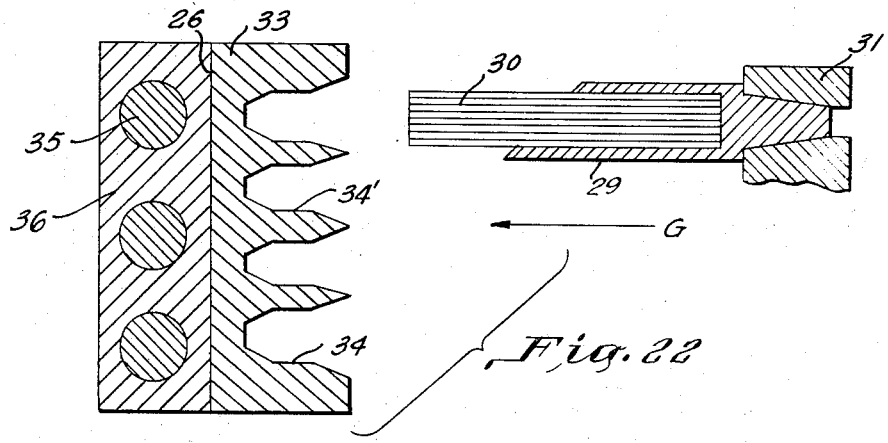

FIGURE 22 is a side cross-sectional view taken along line CC—CC in FIGURE 17 of the heat sealing die.

Figure 23:
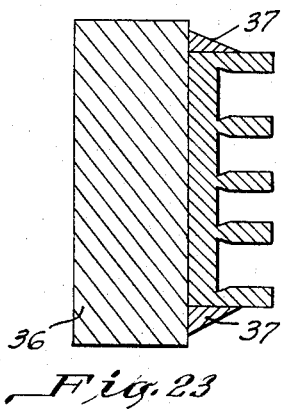

FIGURE 23 is a side cross-sectional view taken along line DD—DD in FIGURE 17 of a brush back and brush back mounting support.

Figure 23A:
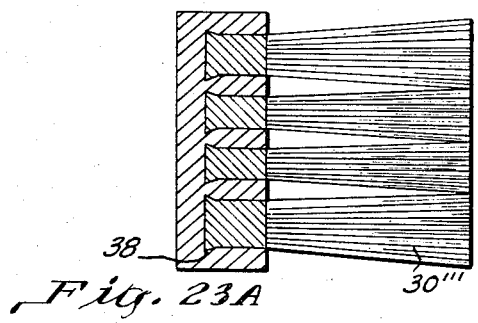

FIGURE 23A is a side cross-sectional view taken along line EE—EE in FIGURE 19 illustrating a brush with tufts made according to this invention.

Figure 24:
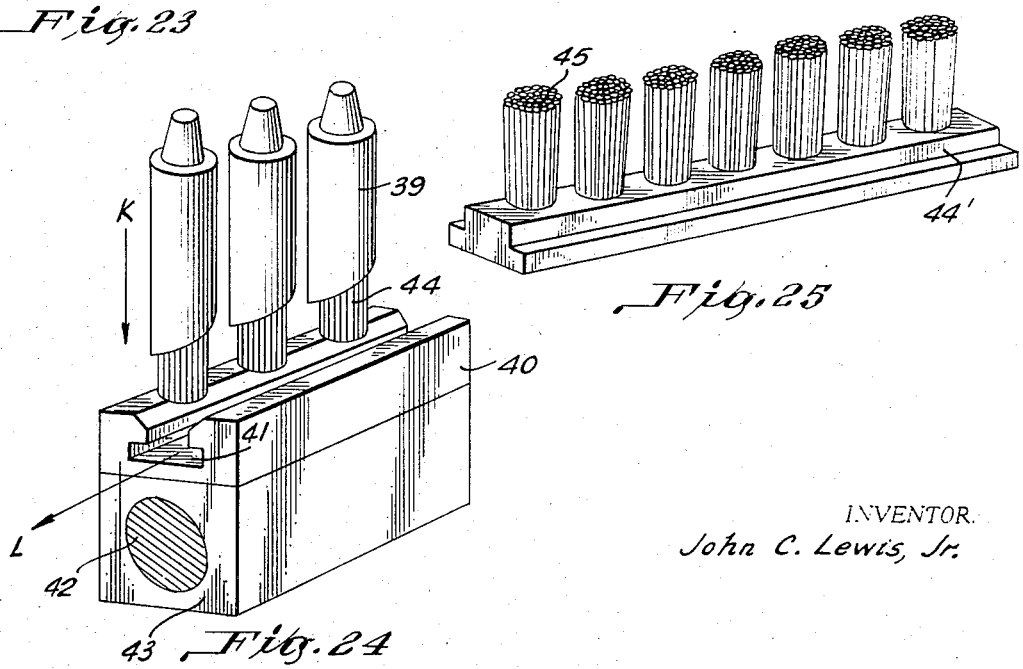

FIGURE 24 is a perspective view illustrating how the tuft forming pickers of FIGURE 1 may be employed to form a continuous tufted strip-brush construction.

Figure 25:
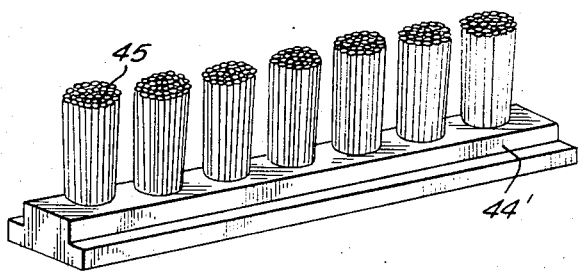

FIGURE 25 is a perspective view of a strip-brush made according to the manner illustrated in FIGURE 24.

In order to describe the invention more fully, reference is now made to specific embodiments illustrated in the drawings. The invention is directed to brush making wherein tufted brushes are formed employing tuft forming pickers in such a manner that each tuft contained in the brush back is simultaneously picked, simultaneously prepared for insertion as a heat sealed tuft into a brush back thus forming a complete brush in the same instant of time it requires an ordinary brush machine to pick and staple-set one fibre tuft. This new and novel way to pick fibre tufts is achieved by employing a longitudinal tube having a definite shape, i.e., circular cross-section, and limiting its inside length to that of somewhat less than the length of the fibre used for forming a fibre tuft. Such tuft forming pickers are shown in FIGURES 1 through 5.

The tuft forming picker 1 of FIGURE 2 has a venturi section 4 approximately midway along the internal wall as indicated by line 2B—2B. As seen in FIGURE 2B, the venturi section is contructed such that it is constricted thus forming a smaller opening 2 at line 2A—2A. When fibre enters the opening at 2, it is allowed to flow along the tube-like picker and as the fibre approaches the venturi at 4, the fibre is further compressed in order to tighten the unsealed fibre tuft which results in holding the fibre together more firmly in order that they may not fall away. The tapered pin section at 3 provides the means for holding the tuft forming picker in any suitable mounting device.

By employing tuft forming pickers of the type shown in FIGURES 1, 3, 4 and 5 it is possible to form tufts having different shapes. It should be appreciated that other shaped cross-sections can be employed without deviating from the scope of this invention.

A more suitable type of tuft forming picker of this invention is shown in FIGURE 6 wherein the exterior surface of the picker has a section at 7 having a slightly larger diameter which serves to minimize friction between the fibre and the external wall during removal of the tuft forming picker from the stock feed box. A tapered section is placed at 9 allowing fibres to first enter the picker at 8, travel through the internal section up to 9 and stop at the trim forming end, 5. The shape or contour of 5 will determine the trim of the finished fibre tuft. The smaller diameter at 9 acts in much the same way the venturi does in FIGURE 2. The tapered pin section 6 provides means for support of the picking device.

FIGURE 7 shows the tuft forming picker of FIGURE 6 containing synthetic fibre 10 in parallel arrangement. The end of the fibre 10' is slightly compressed together due to the internal taper at 9. Fibre end 10" projects somewhat beyond the end of the tuft forming picker; this end 10" will eventually form the heat sealed portion of the fibre tuft. By controlling the length of both the fibre and the tuft forming picker, it is possible to form tufts having different trim lengths and heat sealed portions.

FIGURES 8, 9 and 10 illustrate how a heat sealed tuft 11' can be formed possessing a rounded trim without having to physically trim the tuft. Fibre 11 in parallel arrangement is inserted into the tuft forming picker and the ends 12 conform to the interior end 12' of the picker. This results in the opposite end 12" conforming to the shape of a concave contour. The sealed fibre tuft will have a fibre length the same as the length for that of the interior of the picker. The excess fibre ends 12" as shown in FIGURE 9 extend outwardly from the tuft forming picker for such a length which makes them desirable for heat sealing. FIGURE 10 shows the finished fibre tuft after having been heat sealed at 12" in FIGURE 9 possessing a rounded trim 12 and a heat sealed tuft end 13.

FIGURES 11, 12 and 13 illustrate different interior configurations which can be employed for forming different trims in fibre tufts. The fibre 14 in FIGURE 11 conforms to the interior shape at 14', likewise, fibres 15 and 16 of FIGURES 12 and 13 respectively conform to the interior shapes at 15' and 16'.

In order to form a heat sealed tuft like the one shown in FIGURE 10 it is necessary to heat the end portion of a group of parallel fibres to a temperature of approximately to that of the melting point of the particular type of synthetic fibre employed. Most thermoplastic fibres have softening points which make them pliable and capable of fusing together under a slight pressure. In the case of oriented synthetic fibres, they usually begin to deorient at their softening temperature, thus causing a decrease in length and an increase in diameter. Consequently, as the heated oriented ends of the fibre soften, they must be shaped and made to fuse in order to create a self-supporting heat sealed tuft. It is usually convenient to cause the fibre ends to become softened while contained within a heated shaping mold. In FIGURE 14 the tuft forming picker 17 containing fibre 18 is moved in the direction D causing the fibre ends 18' to enter the heated shaping mold at 19, the section 19 being more or less a guide means, and filling the cavity 20' of section 20. The tuft forming picker is allowed to remain in this position long enough for the fibre ends 18' to become fused and shaped like the tuft end 18" of FIGURE 15. The cavity section 20 of FIGURE 14 can be fashioned from stainless steel, however, Teflon (the trade name for a polyfluoride polymer made by Du Pont) makes a much more suitable material. The heating means 21 can be set at such a temperature that the time lag of the fibre's entry of the end 18' into the cavity 20' will cause the fibres to fuse but not melt. It is desirable, after fusing the fibres together and imparting the desired shape to the fused portion, to immediately insert the still softened end 18" into a predetermined tuft hole 22 in a brush back 23 of FIGURE 16 causing the end 18" to take the form of the tuft hole. After insertion into the tuft hole, the softened fused portion takes a new shape 18''' and becomes solid upon cooling. When the tuft forming picker 17 is drawn away the heat sealed fibre tuft 24 is left exposed and is securely anchored in the brush back without the aid of the conventional wire anchor or staple.

While the invention is susceptible of embodiment in many different forms, there is shown now in FIGURES 17, 18 and 19 specific embodiments with the understanding that the present disclosure is to be considered as an exemplification of the principle of the invention and is not intended in any way to limit the invention to the embodiments illustrated.

Particular attention is now given to the automatic brush machine shown in FIGURES 17, 18 and 19. This automatic unit consists of three basic forming stations; a synthetic fibre stock box 25, a heating unit for forming the heat sealed fibre tuft ends 26 and a mounting fixture for the brush back 27. The tuft forming picking device 31 in FIGURE 17 is comprised of individual tuft forming pickers 29 and 29' having configurations like the tuft forming pick of FIGURE 1. Outer tuft forming pickers 29 are larger in diameter than the inner tuft forming pickers 29' as shown in FIGURE 20. By having larger diameter tuft forming pickers, a brush may result having larger tufts positioned around its outer parameter. The tuft forming pickers 29 and 29' in the forming device 31 are arranged in such a manner so as to conform to the tuft arrangement desired in the finished brush. Picking is carried out by allowing the picking unit 31 to enter longitudinally to the fibre's length into the stock box 25 as shown in FIGURES 17 and 21, through fibre retaining holes 28 and 28'. The pickers first come into contact with the ends of the fibre 30 and by employing a quick entry in the direction of E the fibres are forced into the interior cavity of each tuft forming picker. Upon reversing the motion of the picking unit 31 the individual tuft forming pickers retract, each filled with a predetermined amount of synthetic fibre. As the picking unit leaves the fibre stock box more fibre 30' falls so as to occupy the empty spaces created by the removal of fibres 30. Suitable means may be employed for vibrating the fibre stock box in order to facilate fibre alignment and mobility. After completing the picking operation, the machine support 32 is indexed forward in the direction F in order to allow the heating unit 26 to align itself opposite the tuft forming picking unit, as shown in FIGURES 18 and 22. The picking unit is moved forward in the direction G until the fibre contained in each tuft forming picker comes into contact with the cavities 34 and 34' of the shaping mold 33. This shaping mold is preferably construtced from Teflon thermoplastic polymer. The mold is attached to a steel mounting plate 36 containing suitable electric heating elements 35. The fibre ends become heated and shaped in the same fashion as previously described and shown in FIGURE 14. Preferably, the fibre 30 is inserted into the cavities and allowed to become heated for 5–10 seconds while the actual temperature of the cavities is kept higher than the melting point of the fibres; i.e. isotactic polypropylene fibres melt in the range from 135 to 145 degrees centigrade (100,000 to 200,000 molecular weight polymer). The cavities in this case might be kept at temperatures in the order of from 150 to 160 degrees centigrade. After the ends of the fibre tufts have been heat sealed, the picking unit 31 is reversed allowing the tuft heat sealed portion to come away from the cavities. This removal can be facilitated by first applying a mold release to the inner surfaces of the mold cavities. However, if Teflon is employed for the cavity structure, a mold releasing agent is not necessary. The machine support 32 is indexed forward in the direction H in order to align the brush support 36 opposite the heat sealed (still moldable) fibre tufts. In FIGURES 19 and 23 the picking unit is then advanced forward in the direction of I whereupon the still moldable fibre tuft ends are inserted into the cavities 39 and 39′ of the brush back 38. As the tuft ends come into contact with the cavities, the moldable end conforms to the cavity contour and cools. The brush back is held against the brush support by means of fixtures 37. Upon reversing the picking unit 31 in the direction J the tuft forming pickers release the fibre and the overall result is a finished brush as shown in FIGURE 23A. The brush back 38 has heat sealed fibre tufts 30‴. The preferred time taken for the complete fabrication of the brush is approximately ten seconds. However, there is no definite time cycle. Each cycle depends upon the type of synthetic fibre employed and the size of the fibre tuft desired. There is no trimming required after forming the brush of this invention since there is no disalignment of fibres when forming the fibre tufts. This is true because there is no doubling of fibres prior to insertion.

By employing tuft picking units as shown in FIGURE 24 it is possible to form continuous modular strips of thermoplastic tufted brush constructions. In order to achieve this, it requires an assembly of tuft forming pickers 39 arranged side by side in a line. After the fibre 44 is inserted in the tuft picking unit, the unit is then moved toward the forming mold 40 in the direction K thus allowing the fibre ends 44 to become softened and fused within the cavity 41. The mold 40 is attached to a steel housing 43 which contains suitable heating elements 42. Upon cooling of the fused fibre ends 44′ the molded construction 45 is indexed forward in the direction L allowing the picking unit to repeat its cycle. When this operation is carried out properly, the modular brush construction 45 as shown in FIGURE 25 results.

The tuft forming pickers of this invention can be constructed from any of the conventional metal elements or alloys known to man. Also, it is possible to construct the picking devices from thermoplastic materials; i.e., polypropylene, polyacetal, polyamide, and the like. The tuft forming pickers are not limited to any given size since they can have any length and internal diameter so long as they conform to a given fibre tuft.

It has been found that the tuft forming pickers of this invention will pick tufts from assembled parallel cut-to-length synthetic fibres having any cross-sectional shape; i.e., circular, X-shaped, star shaped, hollow, and the like. The diameter of the fibres picked range from 0.008 inch to 0.250 inch. The lengths of the cut-to-length fibre can range from 0.5 to 30 inches. The compositions of the synthetic fibre picked and assembled into fibre tufts is not limited, and thermoplastic fibres either oriented or unoriented can be used to form tufts in accordance with the invention. Polymers like polyamide, polypropylene, polyethylene, co-polymers of polypropylene and ethylene, polyfluoride, and the like can be employed.

If more than one fibre stock box is employed, it is possible to pick one color and diameter fibre during one picking step, and another color and diameter during a second picking step and then instantaneously heat seal and assemble the combination of fibre tufts into a brush back.

The foregoing considerations conclusively demonstrate the advantages to be gained by providing picking devices of the type hereinbefore described. When such picking devices are incorporated into automatic brush making equipment there is attained new and novel brush constructions heretofore not known.

The invention in its broader aspects is not limited to the specific steps, methods, compositions, combinations and improvements described but departures may be made therefrom in the scope of the accompanying claim without departing from the principles of the invention and without sacrificing its chief advantages.

I claim:
1. Brush-making apparatus for assembling a plurality of synthetic filaments comprising a filament storage box having an opening for filling, and a plurality of apertures in the front face disposed in a brush tuft configuration; and a picking device comprising a plurality of hollow cylindrical tuft forming pickers corresponding in size, shape, and number to said apertures in said box face and extending from the picking device in parallel relation corresponding to said brush tuft configuration of said box apertures; each said hollow cylindrical picker having a closed end forming means for securing filament pickers to said device, an internal constriction, and an open end having a tapered edge, and being of a length less than the length of a filament; whereby when said tuft forming pickers are inserted and removed from said apertures in said storage box filled with brush filaments, said pickers will simultaneously pick and trim tufts of filaments for assembly into a brush.

References Cited

UNITED STATES PATENTS

| 392,420 | 11/1888 | Fish | 300—21 |
| 1,923,884 | 8/1933 | Pushee | 300—21 |
| 2,531,482 | 11/1950 | Starr | 300—2 XR |
| 2,664,316 | 12/1953 | Winslow et al. | 300—21 |
| 1,759,068 | 5/1930 | Stroud | 300—19 |
| 3,136,582 | 6/1964 | Locher et al. | 300—19 |
| 3,335,909 | 8/1967 | Gelardi | 300—7 X |
| 3,367,719 | 2/1968 | Carlson | 300—7 |

FOREIGN PATENTS

| 705,364 | 3/1954 | Great Britain. |
| 1,240,506 | 8/1960 | France. |

WAYNE A. MORSE, JR., Primary Examiner

U.S. Cl. X.R.
300—5, 7, 21